United States Patent
Cho et al.

(10) Patent No.: US 9,162,645 B2
(45) Date of Patent: Oct. 20, 2015

(54) HIGH PRESSURE AIRBAG FOR OBLIQUE IMPACT MODES

(71) Applicant: FORD GLOBAL TECHNOLOGIES, LLC, Dearborn, MI (US)

(72) Inventors: Jaeho Cho, Shelby Township, MI (US); Jamel E. Belwafa, Ann Arbor, MI (US); James Chih Cheng, Troy, MI (US); Mohammed Omar Faruque, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/550,140

(22) Filed: Nov. 21, 2014

(65) Prior Publication Data

US 2015/0175116 A1 Jun. 25, 2015

Related U.S. Application Data

(60) Provisional application No. 61/919,275, filed on Dec. 20, 2013.

(51) Int. Cl.
*B60R 21/233* (2006.01)
*B60R 21/205* (2011.01)

(52) U.S. Cl.
CPC ............. *B60R 21/205* (2013.01); *B60R 21/233* (2013.01)

(58) Field of Classification Search
CPC ............................ B60R 21/233; B60R 21/205
USPC ......................................................... 280/729
See application file for complete search history.

(56) References Cited

U.S. PATENT DOCUMENTS

| 4,262,931 | A | * | 4/1981 | Strasser et al. ................. 280/729 |
| 5,022,675 | A | | 6/1991 | Zelenak, Jr. et al. |
| 5,044,663 | A | | 9/1991 | Seizert |
| 5,129,675 | A | * | 7/1992 | Wang ......................... 280/743.1 |
| 5,213,361 | A | | 5/1993 | Satoh et al. |
| 5,380,038 | A | | 1/1995 | Hawthorn et al. |

(Continued)

FOREIGN PATENT DOCUMENTS

| CA | 2361732 A1 | 4/2003 |
| DE | 102004011369 A1 | 3/2004 |

(Continued)

OTHER PUBLICATIONS

Non-Final Office Action mailed Oct. 6, 2014 in U.S. Appl. No. 14/260,680, filed Apr. 24, 2014.

(Continued)

*Primary Examiner* — Faye M Fleming
(74) *Attorney, Agent, or Firm* — Frank A. MacKenzie; Brooks Kushman P.C.

(57) ABSTRACT

A vehicle includes a dash panel and an airbag module disposed behind the dash panel. The airbag module includes an airbag assembly that defines, upon inflation in a presence of a passenger, a primary chamber adjacent to a passenger side of the vehicle and configured to cushion the passenger upon impact, and a secondary chamber attached to the primary chamber, arranged adjacent to a center of the vehicle, and configured to catch the passenger after impact. The secondary chamber has an end portion disposed adjacent to the passenger and a base opposite and wider than the end portion arranged to sit against the dash panel to orient the airbag assembly relative to the passenger.

20 Claims, 3 Drawing Sheets

(56) References Cited

U.S. PATENT DOCUMENTS

| | | | |
|---|---|---|---|
| 5,609,363 A * | 3/1997 | Finelli | 280/743.2 |
| 6,254,130 B1 | 7/2001 | Jayaraman et al. | |
| 6,616,184 B2 | 9/2003 | Fischer | |
| 6,962,363 B2 | 11/2005 | Wang | |
| 6,981,719 B2 | 1/2006 | Igawa | |
| 7,334,812 B2 | 2/2008 | Abe | |
| 7,377,548 B2 | 5/2008 | Bauer et al. | |
| 7,571,931 B2 | 8/2009 | Watanabe | |
| 8,215,671 B2 | 7/2012 | Bergstrom et al. | |
| 8,419,053 B2 | 4/2013 | Ahn | |
| 8,544,882 B2 | 10/2013 | Gulde et al. | |
| 2003/0116945 A1 | 6/2003 | Abe | |
| 2005/0098994 A1 | 5/2005 | Matsumura | |
| 2005/0110257 A1 | 5/2005 | Cohen | |
| 2006/0103118 A1 | 5/2006 | Hasebe | |
| 2006/0163848 A1 | 7/2006 | Abe | |
| 2006/0186656 A1 | 8/2006 | Kumagai | |
| 2009/0179404 A1 | 7/2009 | Peyre et al. | |

FOREIGN PATENT DOCUMENTS

| | | |
|---|---|---|
| EP | 1439096 A1 | 7/2004 |
| GB | 2415665 A | 1/2006 |
| JP | 02303951 A | 12/1990 |
| JP | 03032956 A | 3/1991 |
| JP | 08324373 A | 12/1996 |
| JP | 2006088856 A | 6/2006 |
| JP | 2006256508 A | 9/2006 |
| JP | 2009214872 A | 9/2009 |
| JP | 2010241241 A | 10/2010 |
| KR | 20120043551 | 5/2012 |

OTHER PUBLICATIONS

Final Office Action mailed Mar. 2, 2015 in U.S. Appl. No. 141260,680, filed Apr. 24, 2014.

Sherwood, Chris, "An Update on the IIHS Small Overlap Research Program", SAE International, 2012 Government/Industry Meeting, Jan. 25, 2012, Washington, DC, Insurance Institute for Highway Safety, Highway Loss Data Institute.

* cited by examiner

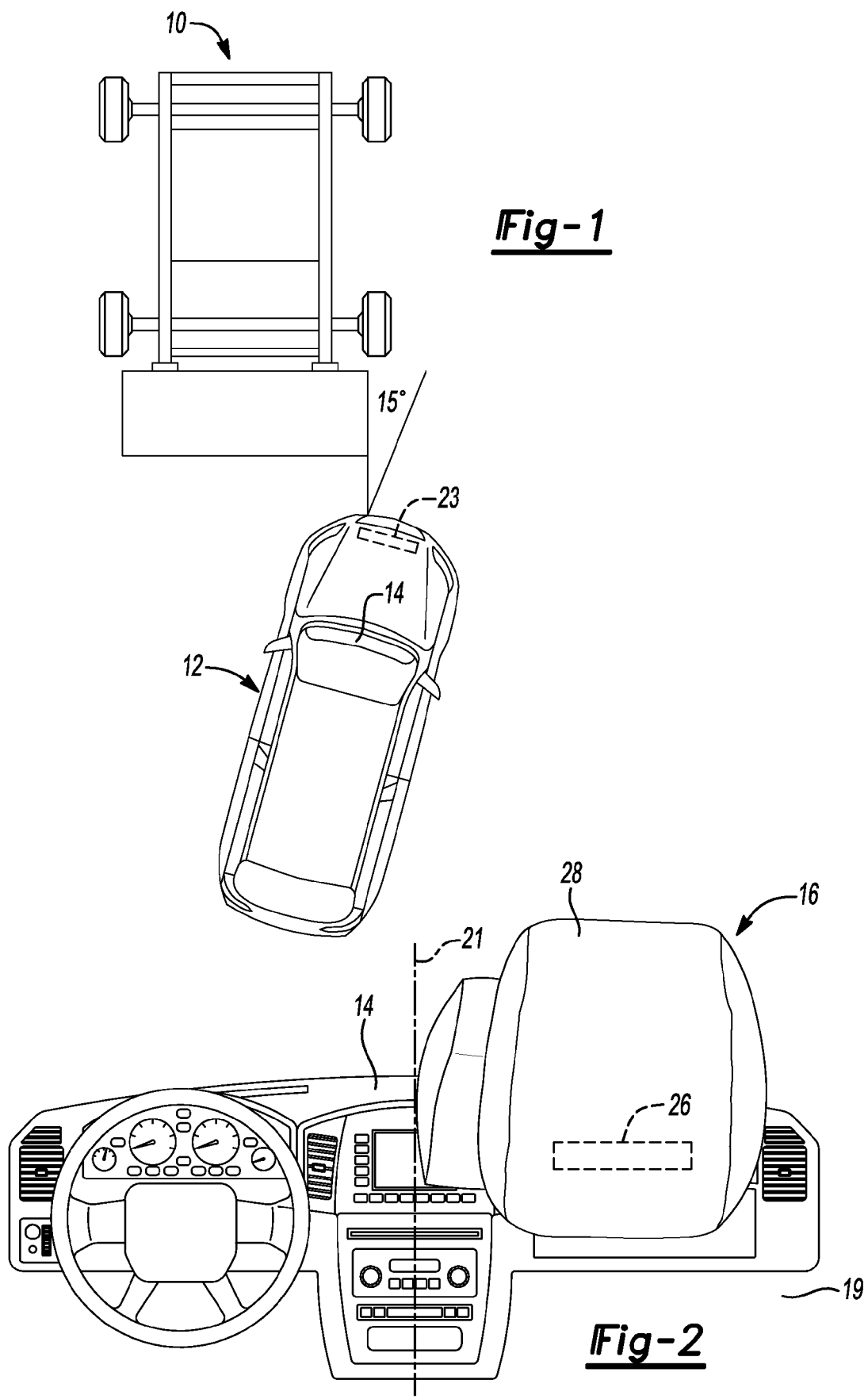

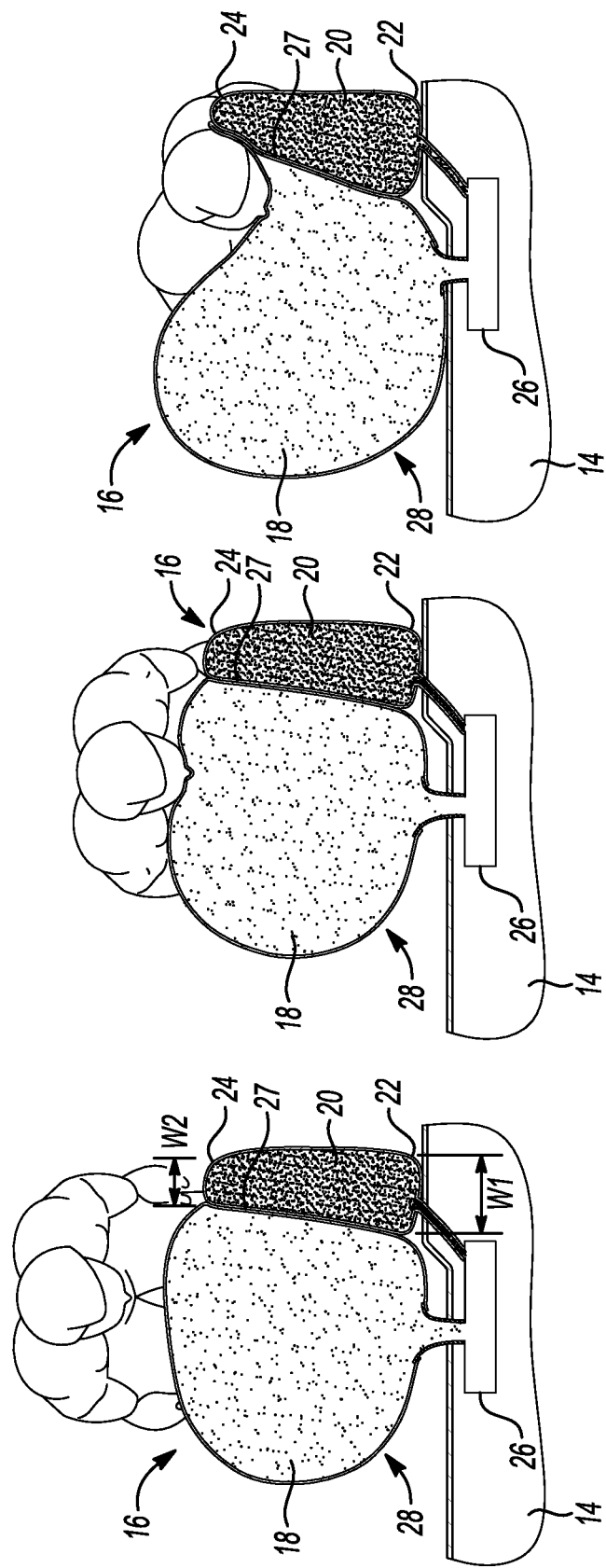

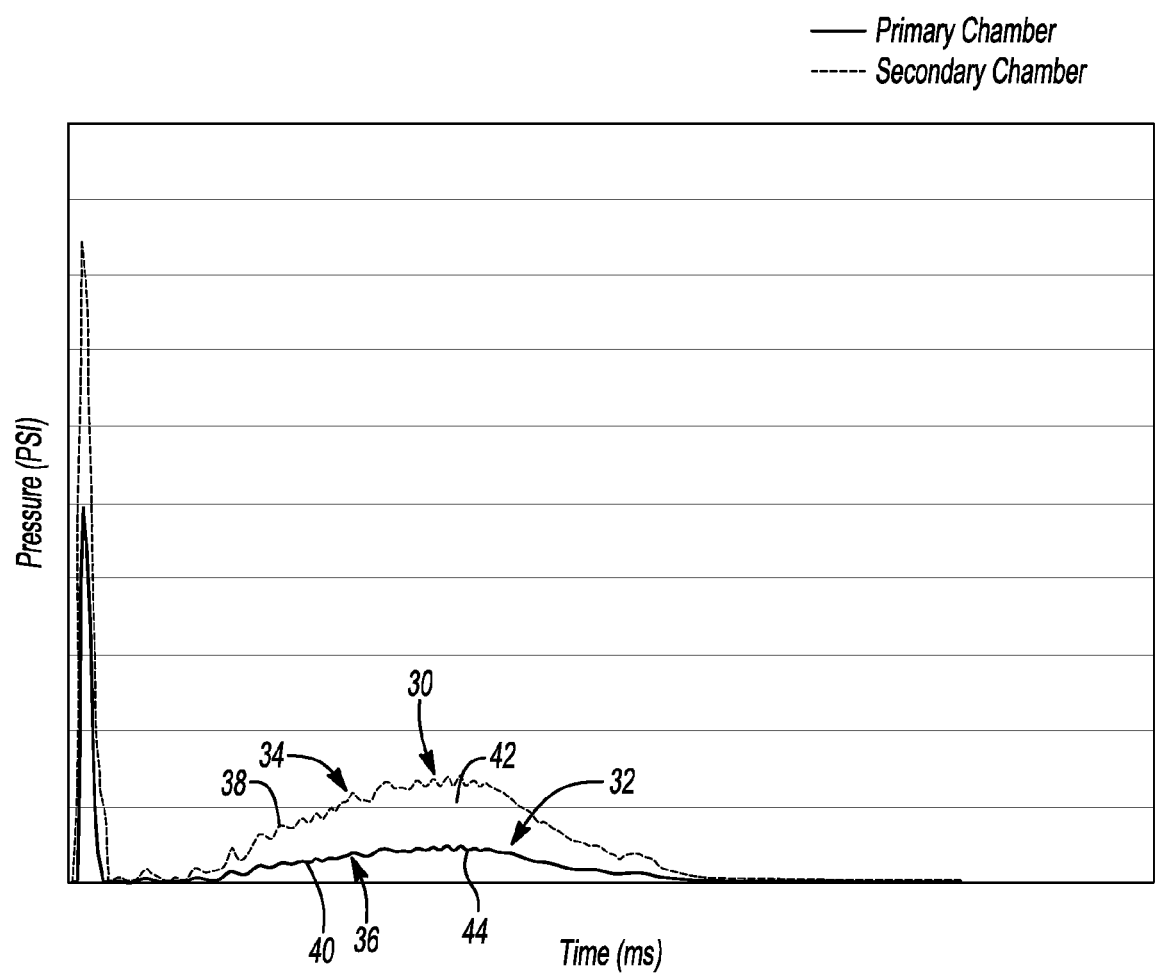

HIGH PRESSURE AIRBAG FOR OBLIQUE IMPACT MODES

CROSS-REFERENCE TO RELATED APPLICATION

This application claims the benefit of U.S. Provisional Application No. 61/919,275, filed Dec. 20, 2013.

TECHNICAL FIELD

The present application relates to passenger side airbags for vehicles.

BACKGROUND

Airbags fill with gas and cushion vehicle occupants as they are displaced within the vehicle. Airbags are designed to absorb energy generated by the displacement of the vehicle occupants. They aid in mitigating occupant injury due to impact with a rigid surface of the vehicle interior.

SUMMARY

A vehicle includes a dash panel and an airbag module disposed behind the dash panel. The airbag module includes an airbag assembly defining, upon inflation in a presence of a passenger, a primary chamber adjacent to a passenger side of the vehicle and configured to cushion the passenger upon impact, and a secondary chamber attached to the primary chamber, arranged adjacent to a center of the vehicle, and configured to catch the passenger after impact. The secondary chamber has an end portion disposed adjacent to the passenger and a base opposite and wider than the end portion arranged to sit against the dash panel to orient the airbag assembly relative to the passenger.

A vehicle includes a dash and an airbag assembly behind the dash. The air bag assembly defines, upon inflation in a presence of a passenger, a primary chamber adjacent a passenger side of the vehicle and a secondary chamber attached to the primary chamber and arranged adjacent a center of the vehicle. The secondary chamber has an end portion adjacent the passenger and a base portion opposite and wider than the end portion arranged to sit against the dash.

A vehicle includes an airbag module, disposed behind a dash, including an inflator and an airbag assembly defining, upon inflation, a primary chamber adjacent a passenger side, and a secondary chamber attached to the primary chamber and arranged adjacent a vehicle center. The secondary chamber has an occupant end and a base opposite and wider than the occupant end arranged to orient the airbag assembly relative to the dash. The airbag assembly includes a panel separating the primary and secondary chambers.

BRIEF DESCRIPTION OF THE DRAWINGS

FIG. 1 is a top view of an oblique impact;

FIG. 2 is front view of a deployed passenger side airbag;

FIGS. 3 through 5 are top views of a vehicle occupant moving toward and into a deployed airbag arrangement during an oblique impact; and FIG. 6 is a line graph representing pressure versus time of the airbag module.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Airbags aid in protecting vehicle occupants during an impact. Impacts may occur in many different ways. Forces from an impact with a vehicle displace an occupant's body. Different impacts displace vehicle occupants in different directions. The displacement of the occupant's body causes the occupant to move toward rigid regions of the interior of the vehicle. As the occupant moves toward the rigid region, the airbag acts as a cushion absorbing energy generated by the force of the impact from the occupant. For example, an oblique impact—an impact at an angle of approximately 15°—may cause a vehicle occupant, or more specifically a passenger, to have a forward rotational inertia moving toward the center of the vehicle interior.

Referring to FIG. 1, an oblique impact between vehicles is shown. Oblique impacts are impacts that occur at an angle, generally at approximately 15°. A first vehicle 10 is shown impacting a second vehicle 12. The impact between the first vehicle 10 and the second vehicle 12 generates a force displacing a vehicle occupant. During an oblique impact, the occupant is displaced having a forward rotational inertia. In the case of a vehicle passenger, the forward rotational inertia moves the passenger toward the center dash panel 14 of the vehicle interior. Therefore, an airbag assembly configured to further receive and further reduce a passenger's forward rotational inertia after an oblique impact may be advantageous.

Referring to FIG. 2, an airbag assembly 28 of an airbag module 16 of the present disclosure is shown. The passenger airbag module 16 is deployed after an impact. The airbag module 16 includes an airbag assembly 28 comprised of a primary chamber 18 and a secondary chamber 20 and an inflator 26. The primary chamber 18 is disposed adjacent a passenger side 19 of the vehicle 10. The secondary chamber 20 may be attached to the primary chamber 18 and may be disposed adjacent a center 21 of the vehicle. The secondary chamber 20 is depicted as having a trapezoidal cross-section. While this may be preferred, other shapes will also suffice. For example, a triangular, rectangular, or semi-annular cross-sectional area of the secondary chamber 20 may suffice.

The airbag assembly 28 is disposed behind the dash panel 14 before an impact and projects toward the vehicle passenger after an impact. In a preferred embodiment, the airbag assembly 28 is deployed from the passenger side 19 of the vehicle. However, the preferred embodiment is merely exemplary and the airbag assembly 28 may be deployed from other areas of the dash panel 14 or elsewhere. The airbag assembly 28 in this example is shown having two chambers. Similar to traditional airbag assemblies, the airbag assembly 28 may also use a single chamber to receive an occupant. Further, the dash panel 14 may contain a plurality of airbag assemblies 28 each containing a single chamber. However, a dual chamber within the airbag assembly 28 is the preferred embodiment and will be discussed in more detail when referencing other Figures.

FIGS. 3, 4, and 5 depict a top view of the occupant's movement, after an oblique impact, toward the airbag module 16. Initially, upon impact, the occupant slides forward and contacts the primary bag 18. As the occupant's body begins to rotate and the airbag module 16 begins to inflate, the airbag assembly 28 responds to the contact between the dash panel 14 and the secondary chamber 20. The push of the secondary chamber 20 on the dash panel 14 allows the occupant to contact a greater area of the primary chamber 18. This allows the airbag assembly 28 to further cushion the occupant and slow the occupant's forward rotational force generated by the oblique impact.

Referring to FIG. 3, a top view of the vehicle passenger airbag module 16 is shown. The secondary chamber 20 includes a base portion 22 and an end portion 24. The base portion 22 contacts and rests on the center dash panel 14. This aids in reducing rotation of the airbag assembly 28. Further, the base portion 22 has a width W1 that is greater than a width W2 of the end portion 24. The greater width helps add rigidity to the airbag assembly 28. Reducing rotation and adding rigidity to the airbag assembly 28 further permits the airbag assembly 28 to cushion an occupant after impact.

The passenger airbag module 16 further includes an inflator assembly 26. The inflator assembly 26 is configured to inflate the airbag assembly 28, including the primary chamber 18 and the secondary chamber 20. The inflator assembly 26 inflates the airbag assembly 28 such that a pressure within the primary chamber 18 peaks at a lower pressure than the secondary chamber 20.

The inflator assembly 26 may be any inflation device. For example, one inflator assembly 26 may use a single inflator 26. This type of inflator assembly 26 may have three stages. When an impact is detected, the inflator assembly 26 will discharge gas into the primary chamber 18 during the first and second stages. This allows the primary chamber 18 to cushion the occupant as the occupant begins to slide forward from the force generated by the impact. Meanwhile, the inflator assembly 26 will discharge gas during a third stage into the secondary chamber 20. This will further permit the primary chamber 18 to cushion the occupant as the occupant continues to be displaced after the impact, as discussed in more detail below.

Another type of inflator assembly 26 may use two inflation devices. A traditional two-stage inflation device may be used for the primary chamber 18 and another inflation device using only a single stage may be used for the secondary chamber 20. Upon impact, the traditional two-stage inflation device will discharge gas into the primary chamber 18 in a similar manner as the first two stages of the three stage inflation device discussed above. A collision sensor 23 may be used to determine a vehicle impact. If an oblique impact is detected, the second inflation device will discharge gas into the secondary chamber 20. This allows the airbag module 16 to be used during any impact event and only inflating the secondary chamber 20 in the event of an oblique impact.

A further inflator assembly 26 may include an adaptive valve. This type of inflator assembly 26 may be similar to the traditional two-stage inflation device. During a vehicle impact, this inflator assembly 26 will discharge gas during the first stage into the primary chamber 18. If an oblique impact event is detected, the adaptive valve will allow the inflator assembly 26 to discharge gas during a second inflation stage into the secondary chamber 20. This may reduce inflation time and further cushion an occupant's forward rotational inertia during an oblique impact. Further an adaptive tether may be used to form the secondary chamber 20. For example, if an oblique impact is detected, the adaptive tether will deploy the secondary chamber 20 allowing the adaptive valve to open as discussed above. Tethering is one example to form the secondary chamber 20. Other ways of forming the secondary chamber include, but are not limited to, stitching or by design.

The secondary chamber 20 may be separated from the primary chamber 18 via a panel 27. The panel 27 may be disposed within and between the primary 18 and the secondary 20 chambers. This allows for separation of the primary 18 and secondary 20 chambers of the airbag assembly 28. Separating the primary 18 and the secondary 20 chambers prevents mixing of the inflation gases in each chamber. Preventing mixing prevents adverse reactions of the airbag assembly 28, during inflation, due to the inflation gas moving between chambers. Therefore, inflation of the primary chamber 18 is separate from inflation of the secondary chamber 20. Inflation of the primary chamber 18 does not affect inflation of the secondary chamber 20.

Referring to FIG. 4, an occupant being received by the vehicle passenger airbag module 16 is shown. Configured to cushion an occupant, the primary chamber 18 may have a greater volume than the secondary chamber 20. Having more volume, the primary chamber 18 may also have a lower pressure than the secondary chamber 20. A higher pressure in the secondary chamber 20 allows the secondary chamber 20 to be more rigid than the primary chamber 18. Further, as discussed above, the secondary chamber 20 may have a wider base portion 22. Again, the wider base portion 22 adds rigidity to the secondary chamber 20. A higher pressure and a wider base portion 22 allow the secondary chamber 20 to act as a barrier. Acting as a barrier, the secondary chamber 20 allows for an orientation such that the primary chamber 18 is held in position to cushion an occupant. The added rigidity of the secondary chamber 20 further aids in containing an occupant when cushioned by the primary chamber 18, reducing rotation of the airbag assembly 28.

The secondary chamber 20 aids to further retain an occupant within the primary chamber 18. For example, as an occupant's forward rotational inertia takes them into the airbag assembly 28, the primary chamber 18 will initially receive the vehicle occupant. However due to the forward rotational inertia of the occupant, the occupant may also contact the secondary chamber 20. Despite providing an added cushion for the occupant, the secondary chamber 20 further aids to slow the forward rotational inertia and allows the primary chamber 18 to further receive the occupant. The secondary chamber 20 catches the occupant in the primary chamber 18. This allows the primary chamber 18 to provide a further cushion for the occupant.

Referring to FIG. 5, an occupant received by the primary chamber 18 is shown. The secondary chamber 20 further aids in preventing rotation of the airbag assembly 28. Due to the wider base portion 22 of the secondary chamber 20, the airbag assembly 28 further resists rotating with the forward rotational inertia of the occupant. Resisting rotation further permits the primary chamber 18 to receive the occupant. Therefore, the secondary chamber 20 helps to further support the primary chamber 18 and further allows the occupant to contact a greater portion of the airbag assembly 28.

Creating a larger contact area between the occupant and the airbag assembly 28 further increases the cushioning effect of the airbag assembly 28. This allows the primary chamber 18 to absorb more energy from the occupant. The more energy the primary chamber 18 is able to absorb, the more the airbag assembly 28 will slow the forward rotational inertia of the occupant. Therefore by having the secondary chamber 20 catch the occupant and reduce overall rotation of the airbag assembly 28, the primary chamber 18 is further adapted to slow the forward rotational inertia of the occupant generated by an oblique impact.

Referring to FIG. 6, a line graph depicting chamber pressure versus time is shown. The Y-axis represents pressure and the X-axis represents time. On the graph of FIG. 6, the dashed line represents the secondary chamber 20 and the solid line represents the primary chamber 18. The graph shows that the secondary chamber 20 has a maximum pressure 30 greater than a maximum pressure 32 of the primary chamber 18.

When analyzing the pressure versus time graph of FIG. 6, there is a noticeable difference between the secondary chamber peak pressure and the primary chamber peak pressure. As discussed above, the secondary chamber 20 has a peak pressure greater than the primary chamber 18. This allows the secondary chamber 20 to be stiffer than the primary chamber 18. The increased relative stiffness of the secondary chamber 20 allows the secondary chamber 20 to act as a barrier. This further aids the primary chamber 18 to receive the occupant and reduces overall rotation of the airbag assembly 28. The pressure difference 42 between the maximum pressure 30 of the secondary chamber 20 and the maximum pressure 32 of the primary chamber 18 is such that the maximum pressure in the secondary chamber 20 is at least twice the maximum pressure of the primary chamber 18.

Further, FIG. 6 shows that the inflator assembly 26 is configured to inflate the airbag assembly 28 in a way such that a rate of pressure increase 34 within the secondary chamber 20 is greater than a rate of pressure increase 36 within the primary chamber 18. This may be evidenced through comparison of the secondary chamber slope 38 and the primary chamber slope 40. The secondary chamber slope 38 sharply increases before it peaks relative to the gradual increase of the primary chamber slope 40. This indicates that the volume of the primary chamber 18 may be greater than the volume of the secondary chamber 20. These values represent a preferred embodiment of the disclosure. While not arbitrary, they may be different according to different embodiments. For example, the inflator assembly 26 may be configured to simultaneously inflate both the primary chamber 18 and the secondary chamber 20. The inflator assembly 26 may also be configured to inflate the primary chamber 18 or the secondary chamber 20 before the other. In this instance, the rate of increase of pressure 34 of the secondary chamber 20 may still be greater than the rate of increase in pressure 36 of the primary chamber 18. However, the time the secondary chamber 20 peaks as compared to the time the primary chamber 18 peaks may differ based on the inflator assembly 26 configuration.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   a dash panel; and
   an airbag module disposed behind the dash panel and including an airbag assembly defining, upon inflation in a presence of a passenger, a primary chamber adjacent to a passenger side of the vehicle and configured to cushion the passenger upon impact, and a secondary chamber attached to the primary chamber, arranged adjacent to a center of the vehicle, and configured to catch the passenger after impact, wherein the secondary chamber has an end portion disposed adjacent to the passenger and a base opposite and wider than the end portion arranged to sit against the dash panel to orient the airbag assembly relative to the passenger.

2. The vehicle of claim 1, wherein a maximum pressure in the primary chamber is less than a maximum pressure in the secondary chamber.

3. The vehicle of claim 1, wherein pressures in the chambers are such that the secondary chamber is stiffer than the primary chamber.

4. The vehicle of claim 1, wherein the airbag module further includes an inflator configured to inflate the airbag assembly such that a maximum pressure in the secondary chamber is at least twice a maximum pressure in the primary chamber.

5. The vehicle of claim 1, wherein the airbag module further includes an inflator configured to inflate the airbag assembly such that a pressure within the primary chamber peaks before a pressure within the secondary chamber peaks.

6. The vehicle of claim 1, wherein the airbag module further includes an inflator configured to inflate the airbag assembly such that a rate of pressure increase within the secondary chamber is greater than a rate of increase in pressure within the primary chamber.

7. The vehicle of claim 1, wherein a volume of the primary chamber is greater than a volume of the secondary chamber.

8. A vehicle comprising:
   a dash; and
   an airbag assembly behind the dash defining, upon inflation in a presence of a passenger, a primary chamber adjacent a passenger side of the vehicle and a secondary chamber attached to the primary chamber and arranged adjacent a center of the vehicle, the secondary chamber having an end portion adjacent the passenger and a base portion opposite and wider than the end portion arranged to sit against the dash.

9. The vehicle of claim 8, wherein a maximum pressure in the primary chamber is less than a maximum pressure in the secondary chamber.

10. The vehicle of claim 8, wherein pressures in the chambers are such that the secondary chamber is stiffer than the primary chamber.

11. The vehicle of claim 8 further comprising an inflator configured to inflate the airbag assembly such that a maximum pressure in the secondary chamber is at least twice a maximum pressure in the primary chamber.

12. The vehicle of claim 8 further comprising an inflator configured to inflate the airbag assembly such that a pressure within the primary chamber peaks before a pressure within the secondary chamber peaks.

13. The vehicle of claim 8 further comprising an inflator configured to inflate the airbag assembly such that a rate of pressure increase within the secondary chamber is greater than a rate of increase in pressure within the primary chamber.

14. A vehicle comprising:
an airbag module, disposed behind a dash, including an inflator and an airbag assembly defining, upon inflation, a primary chamber adjacent a passenger side, and a secondary chamber attached to the primary chamber and arranged adjacent a vehicle center, wherein the secondary chamber has an occupant end and a base opposite and wider than the occupant end arranged to orient the airbag assembly relative to the dash and wherein the airbag assembly includes a panel separating the primary and secondary chambers.

15. The vehicle of claim 14, wherein the airbag assembly includes a tether arranged to at least partially define the secondary chamber.

16. The vehicle of claim 14, wherein a maximum pressure in the primary chamber is less than a maximum pressure in the secondary chamber.

17. The vehicle of claim 14, wherein pressures in the chambers are such that the secondary chamber is stiffer than the primary chamber.

18. The vehicle of claim 14, wherein the inflator is configured to inflate the airbag assembly such that a maximum pressure in the secondary chamber is at least twice a maximum pressure in the primary chamber.

19. The vehicle of claim 14 wherein the inflator is configured to inflate the airbag assembly such that a pressure within the primary chamber peaks before a pressure within the secondary chamber peaks.

20. The vehicle of claim 14 wherein the inflator is configured to inflate the airbag assembly such that a rate of pressure increase within the secondary chamber is greater than a rate of increase in pressure within the primary chamber.

* * * * *